United States Patent [19]
Ferrer et al.

[11] Patent Number: 5,204,668
[45] Date of Patent: Apr. 20, 1993

[54] PLURAL DOCUMENT IMAGE PROCESSING DISPLAY FOR WORK STATIONS

[75] Inventors: Jacques Ferrer, Le Petit-Quevilly; Jean-Jacques Videcoq, Pavilly, both of France

[73] Assignee: Unisys Corp., Blue Bell, Pa.

[21] Appl. No.: 687,898

[22] PCT Filed: Oct. 10, 1990

[86] PCT No.: PCT/US90/05782
§ 371 Date: Jun. 3, 1991
§ 102(e) Date: Jun. 3, 1991

[30] Foreign Application Priority Data

Oct. 11, 1989 [GB] United Kingdom ............... 8922897

[51] Int. Cl.$^5$ .................................................. G09G 1/06
[52] U.S. Cl. ...................................... 340/726; 340/799
[58] Field of Search ............... 340/723, 724, 798, 799, 340/721, 750, 725; 382/56, 41; 395/161

[56] References Cited

U.S. PATENT DOCUMENTS

| | | | |
|---|---|---|---|
| 4,200,869 | 4/1980 | Murayama et al. | 340/723 |
| 4,496,976 | 1/1985 | Swanson et al. | 340/744 |
| 4,593,324 | 6/1986 | Ohkubo et al. | 358/261 |
| 4,598,284 | 7/1986 | Ikegami et al. | 340/750 |
| 4,741,047 | 4/1988 | Sharpe | 382/56 |
| 4,876,651 | 10/1989 | Dawson et al. | 395/164 |

FOREIGN PATENT DOCUMENTS 0331417 9/1989 European Pat. Off. .
2150794 7/1985 United Kingdom .

Primary Examiner—Alvin E. Oberley
Assistant Examiner—Chanh Nguyen
Attorney, Agent, or Firm—John B. Sowell; Mark T. Starr; Thomas J. Scott

[57] ABSTRACT

An image processing station 18 displays data indicative of a plurality of document on a monitor 22 from data stored in a main image store 16 and the image processor 18 accepts commands from a keyboard 26 to print the images or to retrieve a new document from the main store 16 or a video memory 50 which comprises selectable first 56 and second 62 page portions either of which may be loaded with fresh image data while the other page portion is being displayed and documents are swapped from one page to the other when fresh document images are moved into one of the pages.

9 Claims, 5 Drawing Sheets

PLURAL DOCUMENT IMAGE PROCESSING DISPLAY FOR WORK STATIONS

BACKGROUND OF THE INVENTION

1. Field of the Invention

The present invention relates to an apparatus for displaying a received image. The present invention particularly relates to an apparatus for receiving data representative of an image, captured elsewhere, of a real article.

The invention is hereinafter described with reference to it's use in displaying images of documents or cheques. It is to be understood that this is an example and not a limitation to the use of the present invention.

2. Description of the Prior Art

The document processing industry includes processing of cheques, bills, invoices and other paper work relating to buying and selling, shipping and delivery of goods, as well as the normal banking processes. The prior art has shown extensive use of document encoding machines. These are cumbersome, and rely upon the difficult art of moving paper in a controlled manner, and are generally slow and impede the processing of data, from the documents, which is the true purpose of the machine.

The present invention seeks to ameliorate this process by assisting in the processing images of documents rather than the documents themselves. According to a first aspect, the present invention consists in an apparatus for displaying a received image, said apparatus comprising: a main memory for receiving data represented of a succession of images; a display memory for storing data representative of a current image for display; and selection means for selecting a fresh image as the current image; said display memory being coupled to receive data representative of the fresh image from said main memory; said main memory being coupled to receive further data, representative of a an image, to replace that data supplied to said display memory representative of said fresh image.

According to a second aspect, the present invention consists in an apparatus for displaying a received image, said apparatus comprising: a display memory for storing data, representative of a current image for display; and selection means for selecting a fresh image as the current image; said display memory being coupled to receive data, representative of the fresh image; said display memory comprising; a first page for receiving and storing data representative of a first image; a second page for receiving and storing data, representative of a second image; and selection means operative to select said second page to receive and store data when said first page is selected for display and operative to select said first page to receive and store data when said first page is selected for display.

The operator of such an apparatus is required to change the image on the screen from time to time so that images of documents may be examined. In order to speed the display process the present invention order to minimise the amount of actual data required to represent an image, the present invention provides that the data is compressed data, the apparatus comprising a decompressor, operative to decompressed data for storage in the main memory and display.

In order that the succession of images may be updated sufficiently frequently for display in succession, the present apparatus provides that the decompressor is operative to signal when a predetermined amount of data has been decompressed, the main memory, responding to the signal from the decompressor, accepting and storing the predetermined amount of decompressed data.

SUMMARY OF THE INVENTION

In operating such a machine, it is necessary to examine the document. When the document is a cheque, it is necessary to indicate, via a keyboard or other means, the amount. Accordingly, the present invention further provides that data, inicative of values in an image, can be stored in association with data, representative of the image.

BRIEF DESCRIPTION OF THE DRAWINGS

The invention is further explained, by way of an example, by the following description, read in conjunction with the appended drawings, in which.

DESCRIPTION OF THE PREFERRED EMBODIMENT

Figure 1:
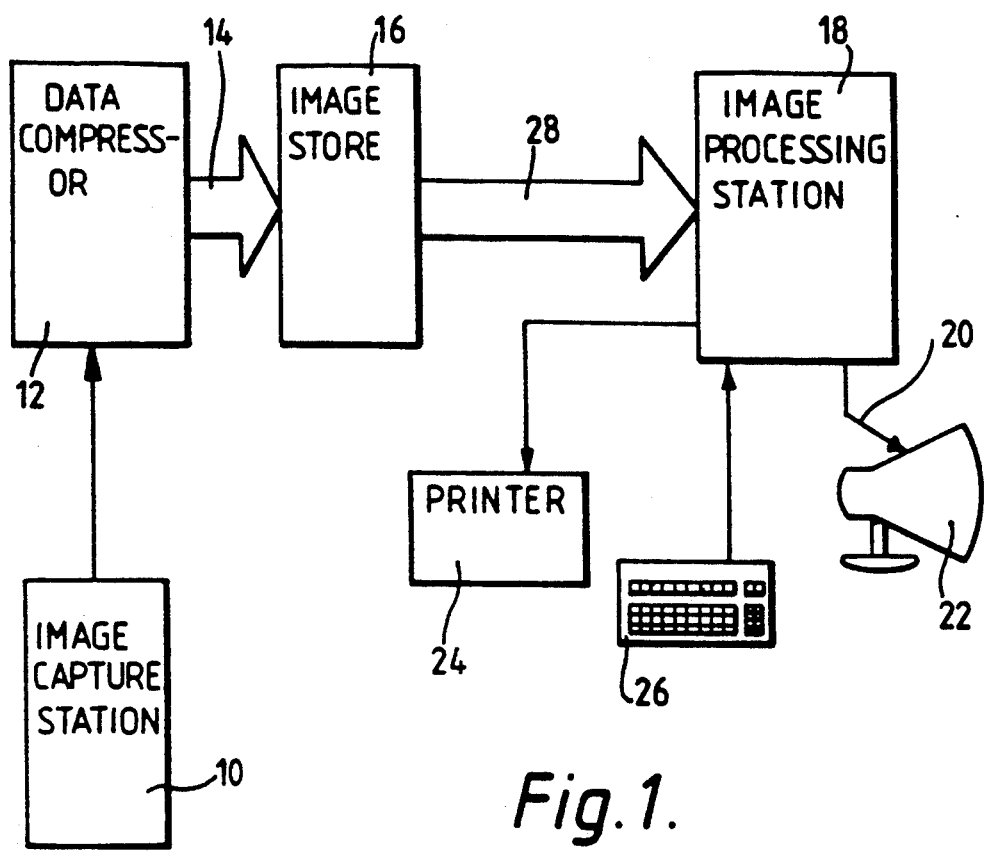
FIG. 1 is a block diagram of the general environment which includes the present invention.

FIG. 1 is a block diagram of the environment which includes the present invention. An image capture station 10 captures images of documents coupled in uncompressed form to a data compressor 12 which removes much of the redundant information from data from the image capture station 10 and reduces it dramatically in volume. Compressed data 14, for storage, is passed to an image store 16 which stores the compressed data from the data compressor 12. On demand, compressed data is passed from the image store 16 to the image processing station 18. The image processing station decompresses data from the image store 16 and sends it via a video coupling 20 to a display monitor 22. The image processing station may also send data or images to be permanently recorded by means of a printer 24. The image processing station 18 also receives data from a keyboard 26. For example, an operator, on examination of the screen of the display monitor 22, may indicate to the image processing station 18 the value recorded on the image of a cheque, invoice, or other document. Compressed data from the image store 16 is received by the image processing station 18 via a bus 28.

Figure 2:
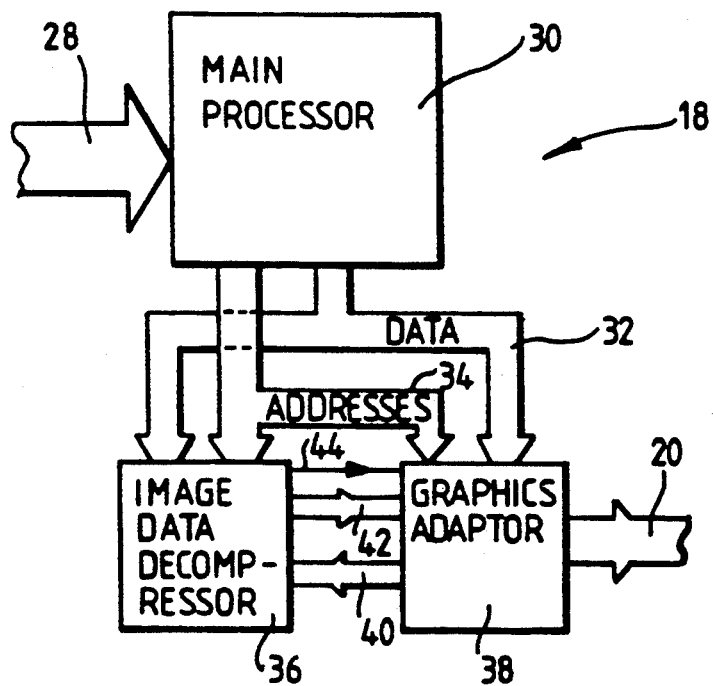
FIG. 2 is a block diagram of the imaging processing station of FIG. 1.

FIG. 2 is a block diagram of the image processing station 18 of FIG. 1. A main processor 30, receives compressed data from the bus 28. The main processor, as is well known in the art, comprises a data bus 32 and an address bus 34. The data 32 and address bus 34 are coupled as controlling inputs firstly to an image data decompressor 36 and secondly to a graphics adaptor 38. The graphics adaptor 38 provides a graphics adaptor address bus 40 as an input to the data decompressor 36 and receives data from the data decompressor 36 via a graphics adaptor data bus 42. The image data decompressor 36 provides an interrupt line 44 to the graphics adaptor 38. The video coupling 20 passes from the graphics adaptor 38 to the display monitor 22 as indicated in FIG. 1.

Compressed data, from the image store 16 is received on the bus 28 by the main processor 30 which, by manipulation of the address on the address bus 34 addresses areas in the decompressor 36 for provision of compressed data, word by work and block by block, to the decompresser 36 via the data bus 32. This manner of provision of data to a peripheral card or board is well known in the art. In general terms, the image data decompressor 36 and the graphics adaptor 38 are cards mounted, for example, on a mother board in a processor.

Figure 3:
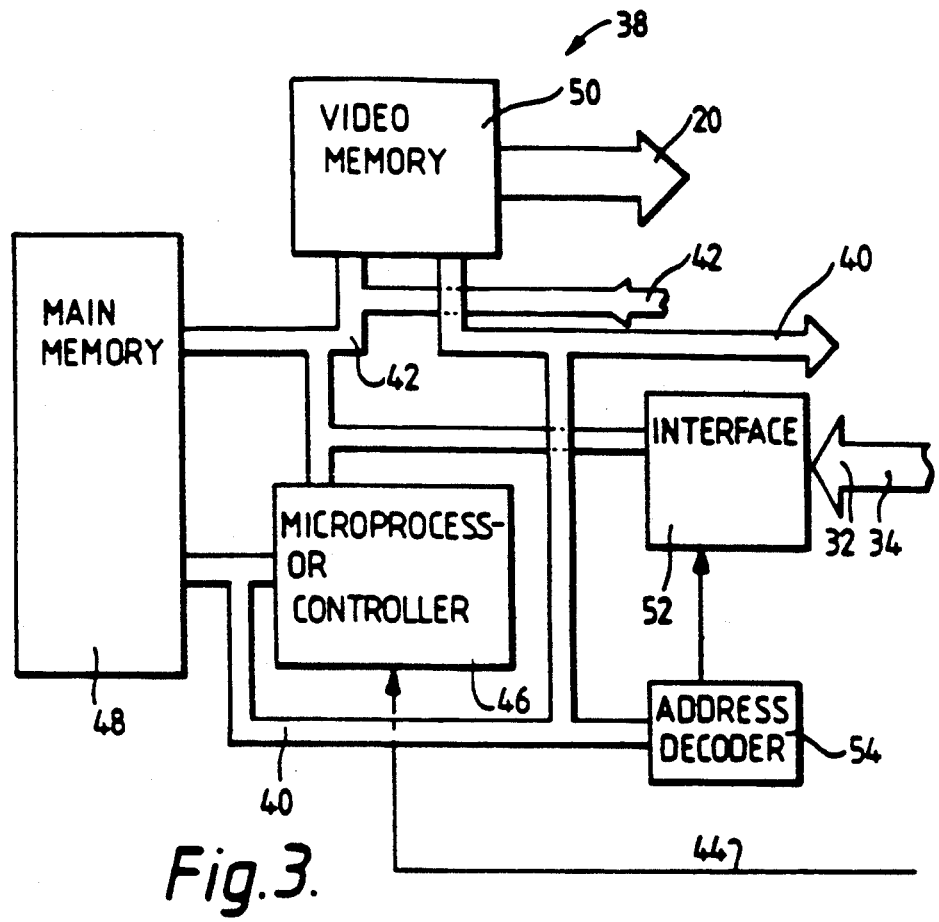
FIG. 3 is a block diagram of the graphics adaptor of FIG. 2.

When the decompressor 36 has received a predetermined amount of data, equal to half of its storage capacity, its signals to the graphics adaptor 38 via the interrupt line 44 and the graphics adaptor 38 responds by providing a succession of addresses on the graphics adaptor address bus 40 to control access to the decompressed data, now stored in the decompressor 36, and accepts the decompressed data on the graphics adaptor data bus 42 for transfer to and storage in the graphics adaptor 38. FIG. 3 shows a block diagram of the graphics adaptor 38 of FIG. 2.

A microprocessor controller 46 provides the graphics adaptor address bus 40 and the graphics adaptor data bus 42 to a main memory 48, a video memory 50, and an interface 52 operating in conjunction with an address decoder 54. The video memory 50 directly drives the video coupling 20 to provide images on the display monitor 22. It is to be understood that the video memory 50 is automatically scanned at the required rate for display of an image on the display monitor 22 when not engaged in other operations. The microprocessor controller 46 manipulates the signals on the graphics adaptor address bus 40 and the graphics adaptor data bus 42 to store and retrieve program and image data in the main memory 48, and to transfer the data from the main memory 48 to the video memory 50. The microprocessor controller 46 also manipulates the signals on the graphic adaptor data bus 42 and the graphics adaptor address bus 40 to retrieve image representative data, as previously described, from the decompressor 36. This method of 'direct memory access' between the graphics adaptor 38 and the data decompressor 36 may be achieved by any means known in the art.

The main processor data bus 32 and the main processor address bus 34 are generally shown as being coupled to the interface 52. When the address decoder 54 detects predetermined addresses on the grapics adaptor address bus 40, it activates the interface 52 to receive data from and transfer data to the main processor data bus. By decoding the contents of the main processor data bus 32 and the main processor address bus 34 the graphics adaptor 38 is able to receive commands from the main processor 30. The exact nature and type of these commands does not form part of the present invention.

Use of the graphics adaptor data bus 42 and the graphics adaptor address bus 40 in a 'direct memory access' mode to the data decompressor 36 allows for very rapid transfer of video data to the graphics adaptor 38 avoiding use of the main processor data bus 32 and the main processor address bus 34. In the way, time and activity of the main processor 30 is better used in its housekeeping and greater utility and speed is achieved by the graphics adapter 38.

When an image is to be stored in the main memory 48, the microprocessor controller 46 provides a sequence of addresses on the graphics adaptor address bus 40 in sympathy with the data to be stored on the graphics adaptor data bus 42, at the same time commanding the main memory 48 to store the data. Likewise, the same process is used to transfer data from the main memory 48 to the video memory 50. A sequence of addresses on the graphics adaptor address bus 40 is provided both to the video memory 50 and to the main memory 48. Data, retrieved from the main memory 48, may either bu stored directly to the video memory 50 via the data bus, or temporarily stored in a cache memory in the microprocessor controller 46 for later transfer to the video memory 50. Either way, data is first retrieved from the main memory 48, piece by piece, and then transferred, piece by piece, to the video memory 50.

When the decompressor 36 has achieved half of its capacity for decompression and storage, its sends a signal on the interrupt line 44 directly to the microprocessor 46 which responds by receiving data according to the flow chart of FIG. 6, later to be described.

Figure 4:
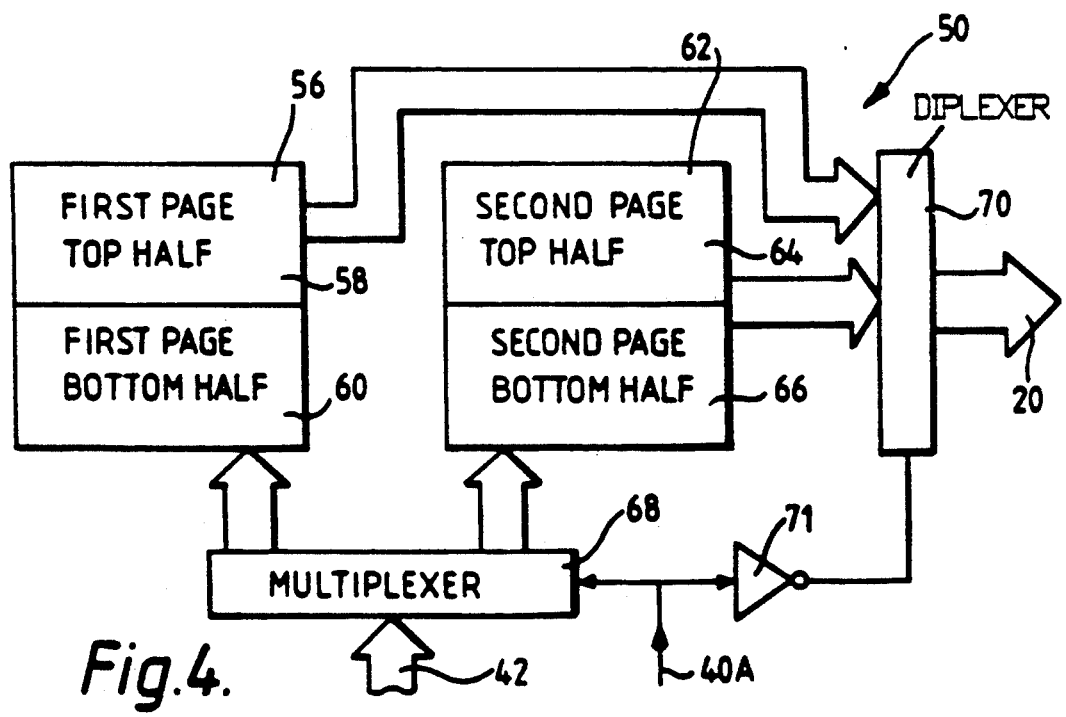
FIG. 4 is a block diagram of the video memory of FIG. 3.

FIG. 4 shows a block diagram of the video memory 50 of FIG. 3. The video memory 50 comprises a first page 56 divided into a top half 58 and a bottom half 60. The video memory 50 also comprises a second page 62 comprising in turn a top half 64 and a bottom half 66.

A multiplexer 68 selects either the first page 56 or the 2nd page 62 to recieve data from the graphics adaptor data bus 42. A diplexer 70 accepts data, selectively, either from the first page 56 or from the second page 62. A selected line 40A from the graphics address bus 40 is coupled as input to the multiplexer 68 and, via a logical inverter 71, as a controlling input to the diplexer 70. The actions of the multiplexer 68 and the diplexer 70 is so chosen, that, when the multiplexter 68 selects the first page 56 for receipt of data, the diplexer 70 selects the second page 62 for provision of data onto the video coupling 20, and when the multiplexer 68 selects the second page 62 for receipt of data from the graphics adaptor data bus 42, the diplexer 70 selects input from the first page 56 for provision to the video coupling 20. It is to be understood that the page 56, 62 selected for provision of signals on the video coupling 20 is automatically scanned for data retrieval at a rate consistent with operation of the display monitor 22 and that the full graphics adaptor address bus 40 is selected to provide addresses for data storage in that page 56, 62 selected to receive data from the multiplexer 68. Those skilled in the art will be aware how such switching is achieved using a multiplexer 68 and a diplexer 70 in a similar manner.

Figure 5A:
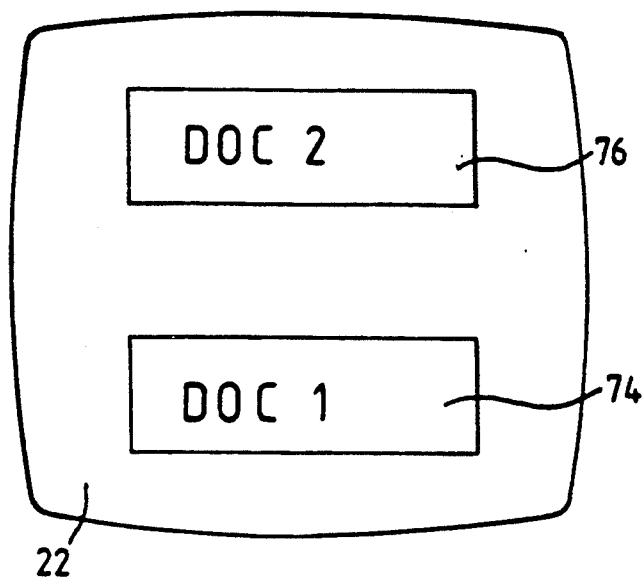
FIG. 5A shows a first display on the video monitor of FIG. 1
Figure 5B:
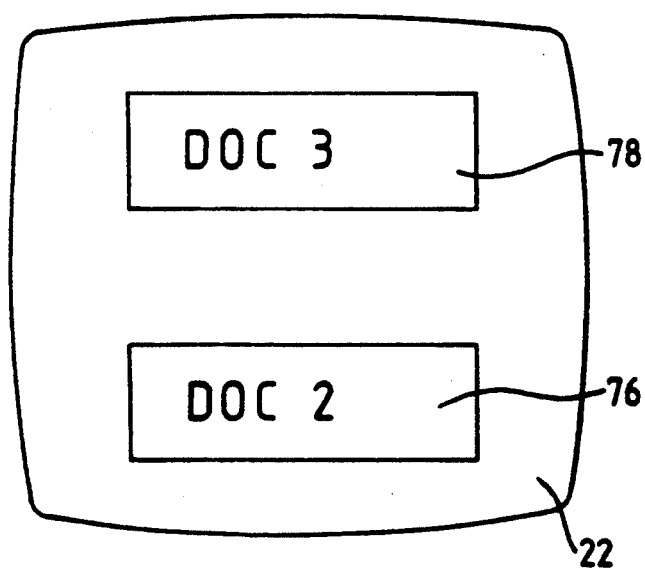
FIG. 5B shows the next successive display on the monitor.

FIG. 5A shows a first display screen on the video monitor 22 and FIG. 5B shows a second display screen on the video monitor 22. In the first display screen an image of a first document 74 is displayed at the bottom of that page 56,62 selected for display, and the image of a second document 76 is stored in and displayed at the top half of that page 56,62 now selected for display by the diplexer 70. At the same time, the image 76 of the second document is stored in the bottom half of that page 56,62 not selected for display and the image 78 of a third document is stored in the top half of that page 56,62 not selected for display. When the operator indicates by use of the keyboard 26 that a fresh image is required on the display monitor 22, the microprocessor controller 46 changes the logical value on the selected bit line 40A of the graphic adaptor address bus 40 to select the other page 56,62. The image then immediately reverts to that shown in FIG. 5B. There is no waiting.

As soon as the image of FIG. 5B is displayed, the microprocessor controller 46 commences to fill the page, now de-selected for display, with fresh images. The image 78 of the third document is stored in the bottom half of the non-display page 56,62 and a yet further image (not shown in FIG. 5A or 5B) is stored in the top half of that page.

Figure 6:
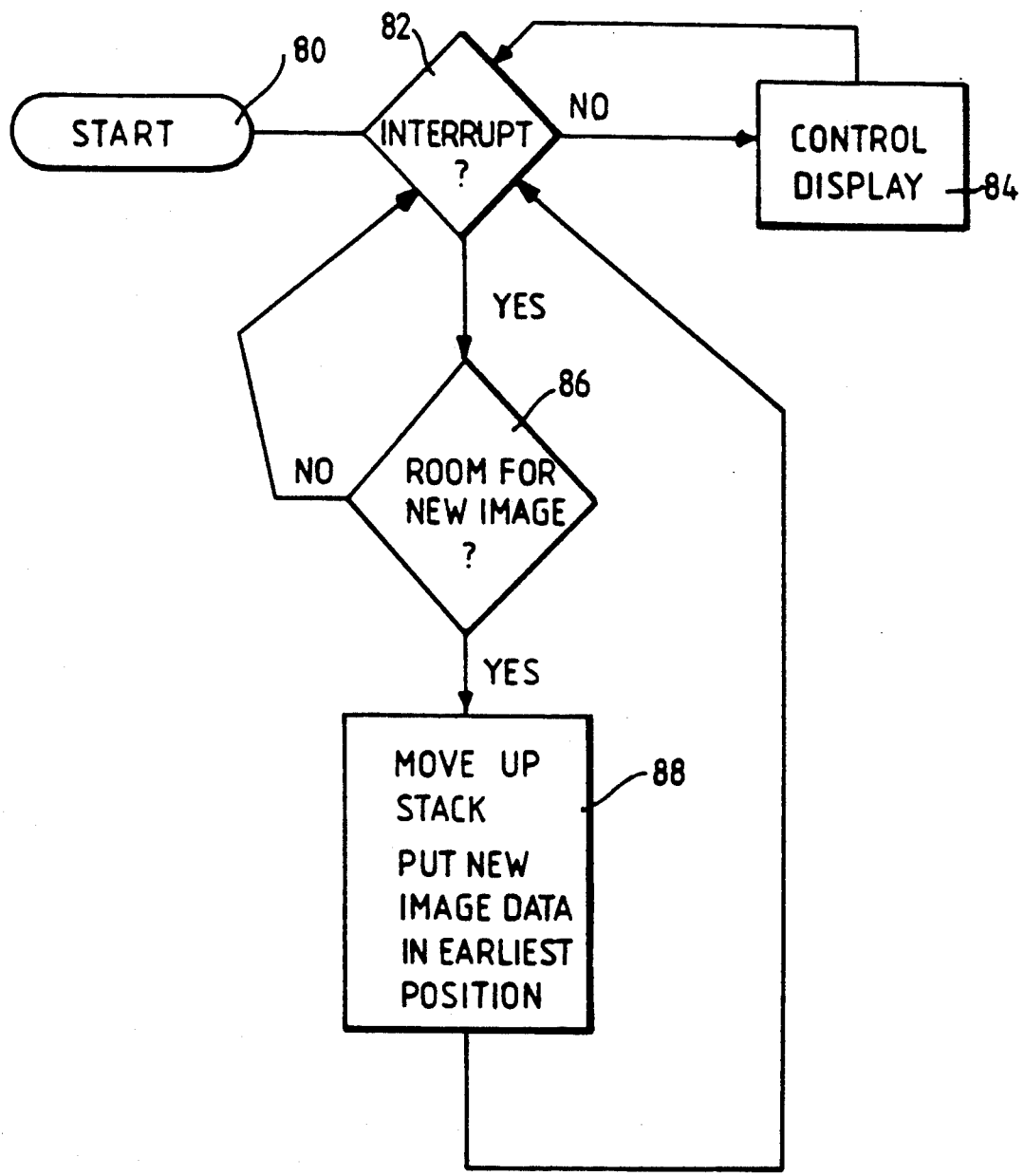
FIG. 6 is a flow chart indicating how the graphics adaptor of FIG. 2 organizes data within its main memory.

FIG. 6 is a flow chart of the activity of the graphics adaptor 38 of FIG. 2 in acquiring data form the decompressor 36.

From start up 80 the graphics adaptor passes to a first test 82 where it waits for an interrupt from the data decompressor 36 on the interrupt line 44. If the first test 82 detects no interrupt, control is passed to a first activity 84 where the display 22 is controlled. This first activity 84 is more fully described with reference to FIG. 7.

If the first test 82 detects an interrupt from the decompressor 36 on the interrupt line 44, control is passed to a second test 86 which looks to see if there is room for a new image in the main memory 48. If the operator has not requested display of a fresh image in the video memory 50, the contents of the main memory 48, should it be full, remain unchanged. Under these conditions, the second test 86 detects that there is no room for a new image and passes control back to the first test 82.

If the second test 86 detects that there is indeed room for a new image in the main memory 48, control is passed to a first operation 88 where those images, already stored in the main memory 48, are moved up the stack. The main memory 48, in this instance, is chosen to store as many as six images. If there is room in the main memory 48 for a fresh image, all of the previously stored images are moved up one place in a first-in first-out (FIFO) stack. New data, representative of a fresh image, is then put in the earliest position in the stack in the main memory 48 and that image, longest in the main memory 48 is readied for provision to the video memory 50. As earlier described, data is deposited in the main memory by manipulation of blocks of addresses on the graphic adaptor address bus 40 and the graphics adaptor data bus 42.

Figure 7:
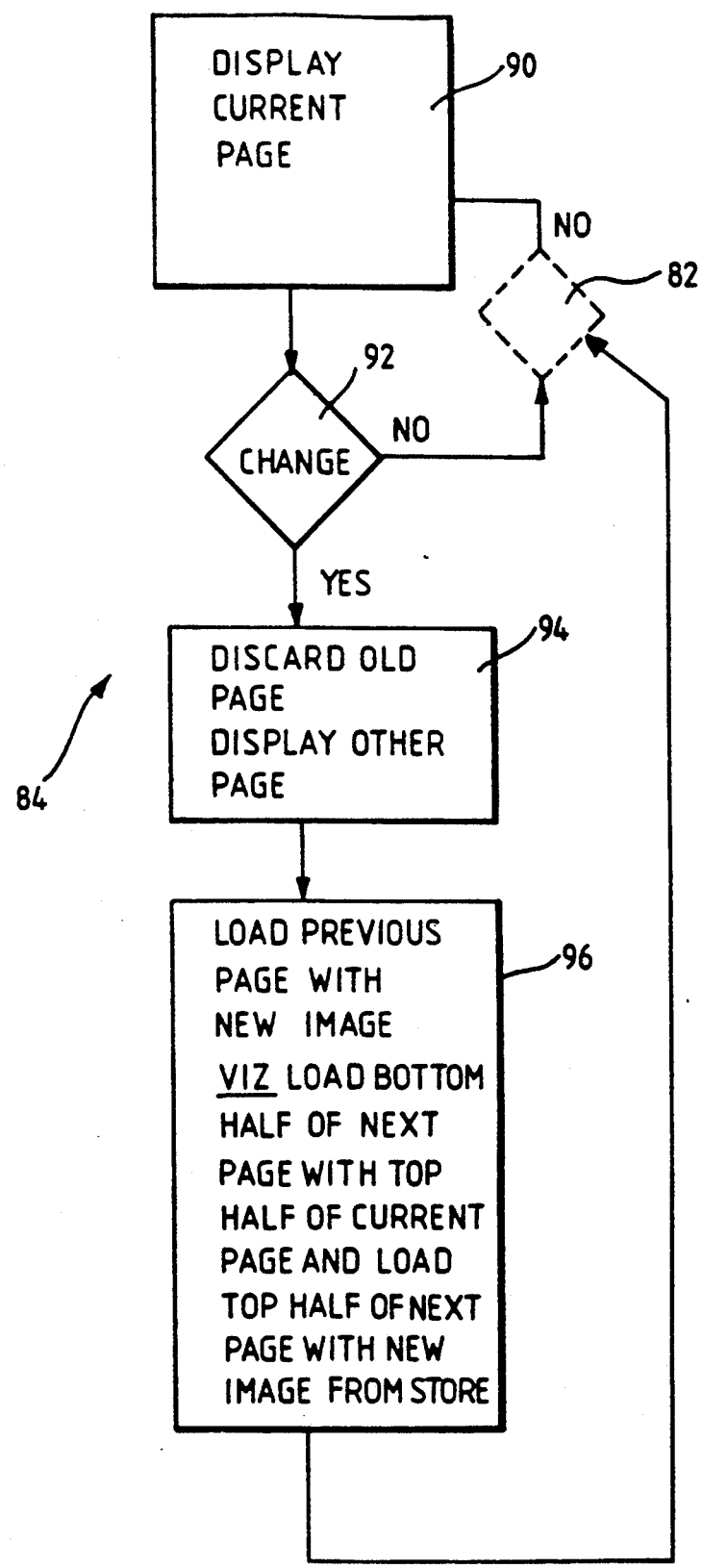
FIG. 7 is a flow chart showing how the graphics adaptor of FIG. 2 loads data into the video memory of FIG. 3 for display.

FIG. 7 is a flow chart of the first activity 84 of FIG. 6 which controls the display 22.

From the first test 82 (shown in broken outline) control is passed to a second operation 90 which displays the current page 56,62, as earlier described, via the video coupling 20 and the diplexer 70, on the display monitor 22. Control is regularly passed to a third test 92 which looks for a changed command from the operator via the keyboard 26. If no change is required, control is passed back to the first test 82 of FIG. 6. If the third test 92 detects a requirement for change, control is passed to a third operation 94 which discards the contents of that page 56,62 previously the current page, and switches the display to the opposite page 56,64, pre-loaded as earlier described. Control is then passed to a fourth operation 96 where the page, now not selected for display, is loaded via the multiplexter 42 and the graphics adaptor address bus 40 with a fresh image. That image, stored and now displayed in the top half of that page 62, 56 currently selected for display by the diplexer 70, is stored by the microprocessor controller 46, manipulating the graphics adaptor data bus 42 and the graphics address bus 40 in the bottom half of the other page 62,56 not selected for display. At the same time, data representative of a fresh image is retrieved from the main memory 48 and stored in the top half 64,58 of that page 56,62 not selected for display.

The fourth operation 96 passes control back to the first test 82 for continuation of the flow chart of FIG. 6.

Fresh data, having been supplied to the video memory 50, the main memory 48 is ready to receive fresh data from the data compressor 36 should it indicate, via the interrupt line 44, that data is available. In this instance, the second test 86 of FIG. 6 would provide indication that there is indeed, room for a new image.

The invention has been described with reference to a particular embodiment. It is to be appreciated that the invention extends to any and all permutations and combinations of apparatus and operation hereinbefore described.

We claim:

1. An apparatus for displaying a received image, said apparatus comprising:
   a main memory for receiving data representative of a plurality of images,
   a video display memory coupled to said main memory for storing data representative of one of the plurality of images to be displayed,
   said display memory comprising a first page portion for receiving and storing a first image, and a second page portion for receiving and storing a second different image,
   each said page portions of said display memory being divided into a top document half and a bottom document half, and
   selection means operative to select one of said page portions to receive and store data and to simultaneously select the other page portion for display, and
   when said first page portion is selected for display, data in the top half of said first page portion is transferred to and stored in said bottom half of said second page portion.

2. An apparatus according to claim 1 for use where said main memory data is compressed data, said apparatus further comprising a decompressor, which is operative to decompress data for storage in said display memory.

3. An apparatus according to claim 2 wherein said decompressor is operative to generate a signal when a predetermined amount of data has been decompressed; said display memory, in response to said signal from said decompressor being operative to accept and store said predetermined amount of decompressed data.

4. An apparatus according to claim 1 wherein data indicative of values read from an image is stored in association with said data representative of the image.

5. An apparatus according to claim 4 for use where each image is an image of a document.

6. An apparatus for displaying a received image, said apparatus comprising: a display memory for storing data representative of a current image for display; and selection means for selecting a fresh image as the current image; said display memory being coupled to receive data, representative of a first image; said display memory comprising; a first page for receiving and storing data representative of a first image; a second page for receiving and storing data representative of a second image; and selection means operative to select said second page to receive and store data when said first page is selected for display and operative to select said first page to receive and store data when said second page is selected for display; and wherein said first page comprises a top half and a bottom half; wherein said second page comprises a top half and a bottom half; and wherein, when said second page is selected for display, data in said top half of said first page is transferred to and stored in said bottom half of said first page.

7. An apparatus according to claim 6 for use where said data is compressed data, said apparatus comprising a decompressor which is operative to decompress data for storage in said main memory.

8. An apparatus according to claim 6 wherein data indicative of values read from an image is stored in association with said data representative of the image.

9. An apparatus according to claim 6 for use where each image is an image of a document.

* * * * *